(12) United States Patent
Schexnaider (10) Patent No.: US 9,353,621 B2
(45) Date of Patent: May 31, 2016

(54) COLLECTING AND REMOVING CONDENSATE FROM A GAS EXTRACTION SYSTEM

(71) Applicant: HALLIBURTON ENERGY SERVICES, INC., Houston, TX (US)

(72) Inventor: Neil Patrick Schexnaider, Rayne, LA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/426,566

(22) PCT Filed: Sep. 18, 2014

(86) PCT No.: PCT/US2014/056214
§ 371 (c)(1),
(2) Date: Mar. 6, 2015

(87) PCT Pub. No.: WO2015/042220
PCT Pub. Date: Mar. 26, 2015

(65) Prior Publication Data
US 2016/0032720 A1    Feb. 4, 2016

Related U.S. Application Data

(60) Provisional application No. 61/879,741, filed on Sep. 19, 2013.

(51) Int. Cl.
*E21B 49/08*  (2006.01)
*B01D 19/00*  (2006.01)
(Continued)

(52) U.S. Cl.
CPC ............... *E21B 49/08* (2013.01); *B01D 19/00* (2013.01); *B01D 19/0063* (2013.01); *E21B 21/067* (2013.01); *E21B 43/34* (2013.01); *F04B 43/0072* (2013.01); *F04B 43/1223* (2013.01)

(58) Field of Classification Search
CPC ....... E21B 21/067; E21B 43/34; E21B 49/08; B01D 19/00; B01D 19/0021; B01D 19/0042; B01D 19/0047; B01D 19/0063
See application file for complete search history.

(56) References Cited

U.S. PATENT DOCUMENTS 2,370,817 A * 3/1945 Shanley ................ E21B 21/067
                                                       436/151
4,645,522 A    2/1987 Dobrotwir
(Continued)

FOREIGN PATENT DOCUMENTS

| WO | 2010065028 | 6/2010 |
| WO | 2011014141 | 2/2011 |

(Continued)

OTHER PUBLICATIONS

International Patent Application No. PCT/US2014/056214, International Search Report and Written Opinion, mailed Jan. 21, 2015, 10 pages.

(Continued)

*Primary Examiner* — Robert Clemente
(74) *Attorney, Agent, or Firm* — Kilpatrick Townsend & Stockton LLP (57) ABSTRACT

A gas extraction system for gas analysis is provided. The gas extraction system includes the use of a peristaltic pump for moving condensates to a liquid trap assembly. An improved fluid flow is thus provided, which includes delivering condensate from a condensate separator to a peristaltic pump and delivering the condensate from the peristaltic pump to a liquid trap assembly.

13 Claims, 4 Drawing Sheets

(51) Int. Cl.
*E21B 43/34* (2006.01)
*E21B 21/06* (2006.01)
*F04B 43/00* (2006.01)
*F04B 43/12* (2006.01)

(56) References Cited

U.S. PATENT DOCUMENTS

| | | | |
|---|---|---|---|
| 4,887,464 | A | 12/1989 | Tannenbaum et al. |
| 7,779,667 | B2 | 8/2010 | Evrard |
| 2006/0202122 | A1 | 9/2006 | Gunn et al. |
| 2009/0199618 | A1 | 8/2009 | Evrard |
| 2010/0228176 | A1* | 9/2010 | Ibragimov ............... F16B 7/06 604/5.04 |
| 2013/0020410 | A1* | 1/2013 | Conrad ................. B05B 7/0408 239/290 |
| 2013/0180404 | A1* | 7/2013 | Fogelman .......... B01D 19/0057 95/266 |

FOREIGN PATENT DOCUMENTS

| | | |
|---|---|---|
| WO | 2012112154 | 8/2012 |
| WO | 2014113037 | 7/2014 |

OTHER PUBLICATIONS

Australian Patent Application No. 2014323584, First Examiner Report, mailed on Mar. 4, 2016, 5 pages.

* cited by examiner

COLLECTING AND REMOVING CONDENSATE FROM A GAS EXTRACTION SYSTEM

CROSS-REFERENCE TO RELATED APPLICATIONS

This is a U.S. national phase under 35 U.S.C. 371 of International Patent Application No. PCT/US2014/056214, titled "Collecting and Removing Condensate from a Gas Extraction System" filed Sep. 18, 2014, which application claims priority to U.S. Provisional Application Ser. No. 61/879,741, titled "Collecting and Removing Condensate from a Gas Extraction System," filed on Sep. 19, 2013, the entirety of each of which is incorporated herein by reference.

TECHNICAL FIELD

The present disclosure relates generally to devices for use in a drilling environment and, more particularly (although not necessarily exclusively), to devices and methods for collecting and removing condensate from a pressurized or non-pressurized gas extraction system, and are particularly useful in conjunction with drilling operations.

BACKGROUND

Drilling operations often include a gas extraction system. Gas-in-air measurements may provide qualitative and quantitative hydrocarbon gas data. This measurement typically uses a gas trap. Drilling mud gasses are separated by agitating the drilling fluid, mixing it with make-up air, and sending the resulting gas to gas analyzers operated in the onsite Surface Data Logging (SDL) unit. Gas-in-mud systems generally include a series of pumps, a separator, a coriolis meter, a heater, and a degasser.

One type of gas extraction system allows a measurement to be taken close to the time of the gas extraction. This system generates a gaseous sample stream from an active drilling fluid system. The gaseous sample stream is delivered to an array of analytical devices and/or collection systems for processing.

DETAILED DESCRIPTION

The general goal of a gas extraction system for use in a drilling environment is to extract gas from drilling fluids and to conduct various analytical procedures on the extracted gas. The disclosed system may be placed near the return drilling fluid path (flow line) so that a fluid sample may be taken without delay between collection and analysis. The shorter the time lapse between sample collection to sample analysis, the more accurately a hydrocarbon zone, or other zone of interest can be identified. As time increases, more gases may be liberated from the drilling fluid. Accordingly, the disclosed gas extraction system may be associated with any type of drilling operation, but may provide additional benefits in gas extraction systems that are positioned near the drilling fluid path. The gas extraction system will generally liberate (e.g., separate and extract) dissolved or entrained gases from active drilling fluids in a controlled manner for the purpose of analytical evaluation.

Various aspects and features of the system disclosed may be used with any appropriate gas extraction system. The gas extraction system may use heat (among other methods) to extract or liberate entrained "species of interest" in the form of gases that are dissolved in the drilling fluid. During this process, vast amounts of water vapor and other gas species generated by this process are subsequently cooled to the point of condensation. They may be collected in a condensate separator or a "drop-out vessel," the contents of which are disposed of in a continuous manner and prevented from traveling downstream to the analytical devices. The process of removing unwanted particulates, vapors, and liquids from a sample stream is referred to herein as "conditioning the sample" or "conditioning."

During conditioning, the lighter species of gases targeted for analysis are separated from the heavier species. The heavier species of gases and water vapor that are collected are pumped out of the gas extraction system as a liquid.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
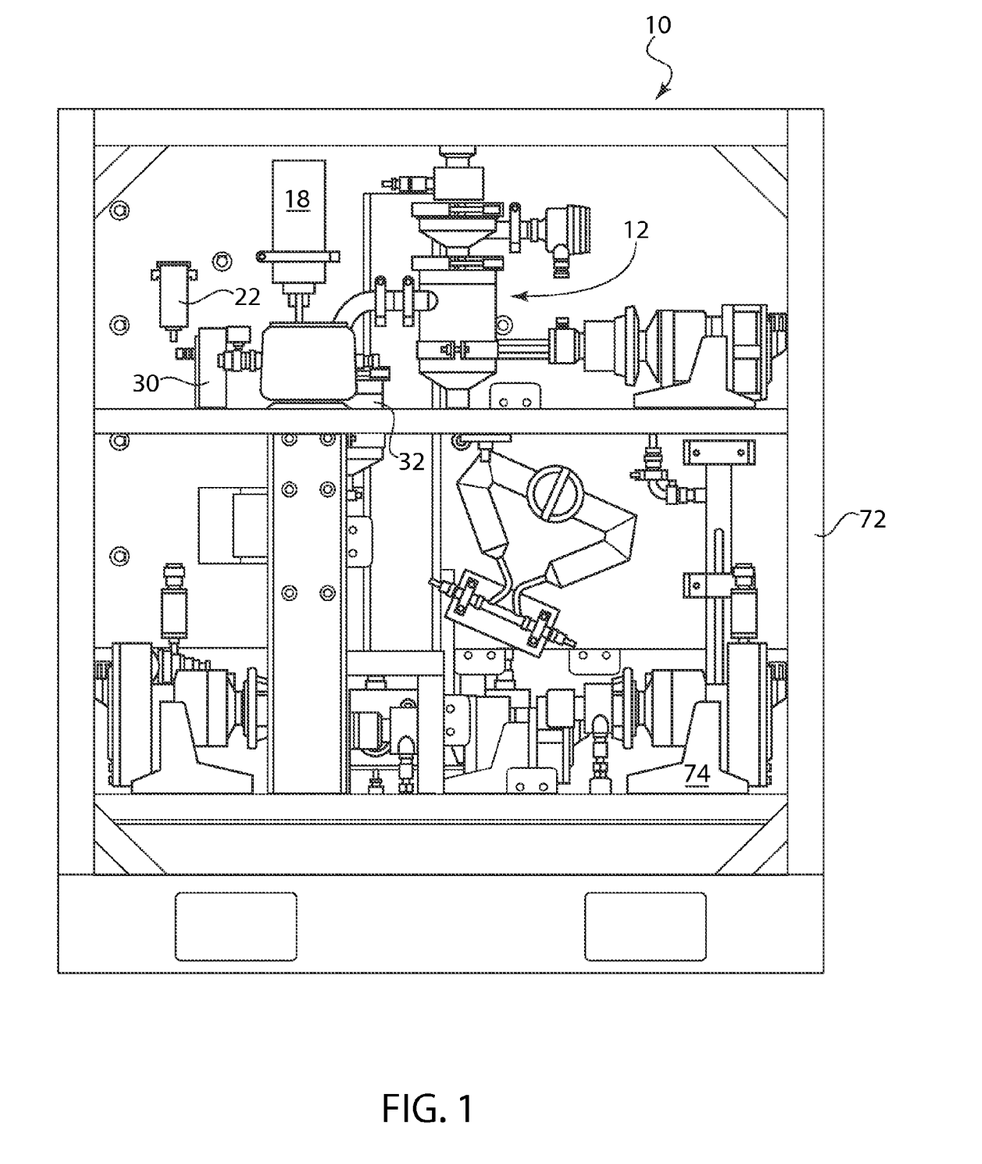
FIG. 1 is a schematic illustration of skid housing that supports various components of a gas extraction system.

FIG. 1 shows one example of a gas extraction system 10 that may use certain aspects and features described herein. The process flow of fluid and condensate through a specific portion of this system 10 is outlined in FIG. 2. One goal of the system 10 may be to extract a portion of the gas from the drilling fluid and to condition the extracted gas so that it can be analyzed. The system may also route the condensates from the extracted gas appropriately.

A portion of drilling fluid may be pulled into the system 10 through a suction tube assembly. The suction tube assembly may be hard mounted into the return drilling fluid path in a flow line. One or more filters may be associated with the suction tube assembly to prevent large solids from entering the flow. Once the drilling fluid has passed through the suction tube assembly, it travels through a hose. In one example, the drilling fluid may be delivered to a gas extraction skid 72 shown in FIG. 1. The skid 72 is a structure that can house the various components of the gas extraction system 10. It should be understood, however, that the gas extraction system 10 may be positioned in any appropriate location. The drilling fluid may be received by a delivery pump 74. The delivery pump 74 pulls the drilling fluid from the suction tube assembly and pushes it through the process until it reaches the degasser 12. Prior to reaching the degasser 12, the fluid may pass through various other pumps (such as a de-aerator pump) and solids removal systems (such as a de-aerator, dampener, separator (DDS), heaters, and/or meters). These systems are not described or shown in any more detail in this application, and are merely referenced to provide background for how the drilling fluid arrives at the degasser 12 in the system 10. It should be understood that any appropriate pumping system and filtering and routing system may be used in connection with this disclosure.

Once the treated fluid 14 reaches the degasser 12, it is ready for further separation. As shown more specifically in FIG. 2, a degasser 12 may receive a stream of heated fluid 14. It can also receive an input of nitrogen 76 and/or an input of de-aerated fluid 78. The degasser 12 may allow any light hydrocarbon gas that may have been liberated by the earlier systems to be captured and conditioned. The degasser 12 may provide a sealed vessel for liberating and separating dissolved gases from the drilling fluids. The degasser 12 may generally agitate the fluids delivered thereto, volatize the fluid for outgassing, and/or reduce surface tension to liberate dissolved gasses. Any type of degasser 12 may be used in connection with this disclosure.

Figure 2:
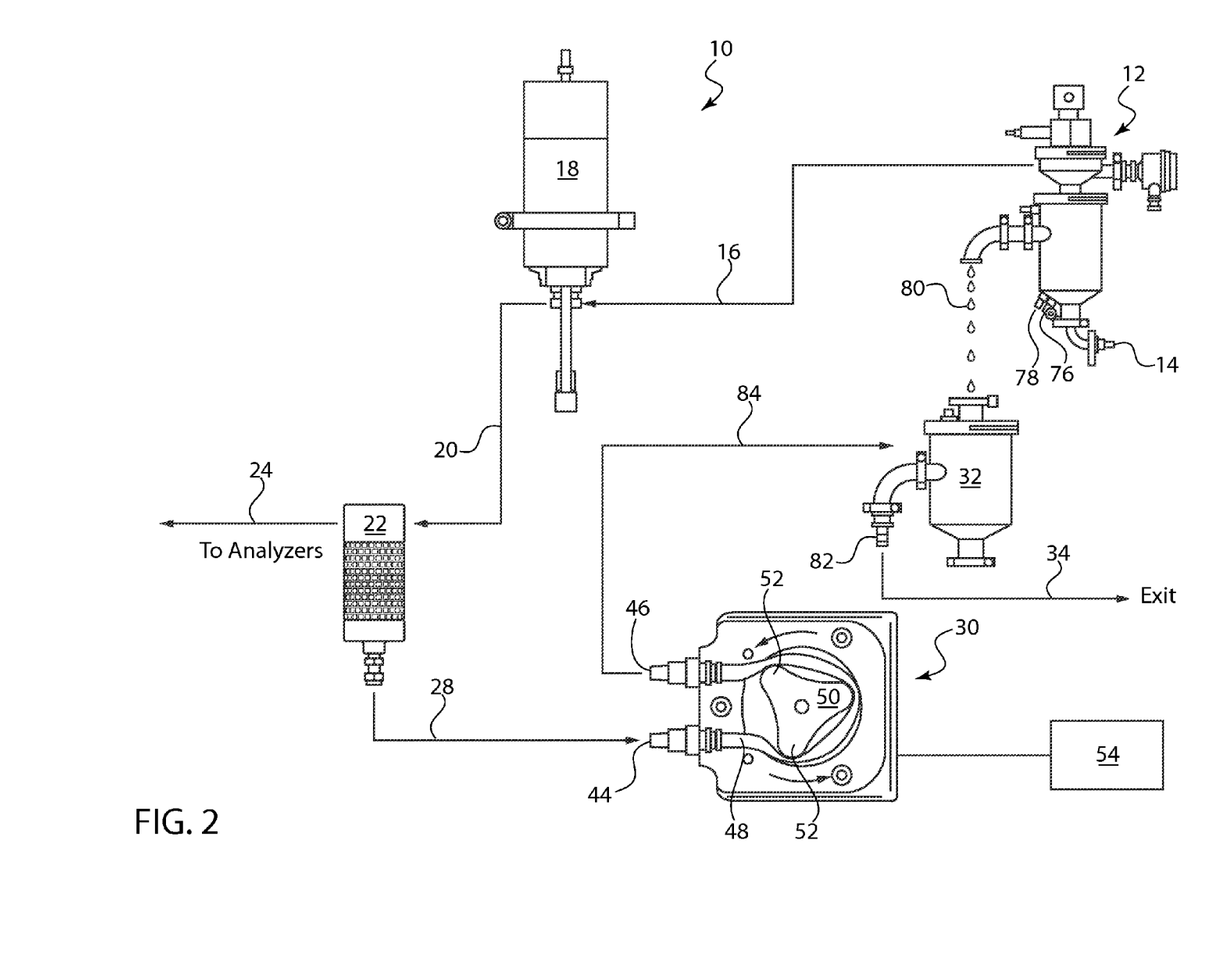
FIG. 2 is a schematic diagram illustrating flow of gas and condensates in a gas extraction system according to aspects of the disclosure.

For example, a vacuum type degasser uses a vacuum action to pull gas out of the liquid. When the liquid 14 enters the degasser 12 tank, it can flow and be distributed to a layer of internal baffle plates designed for the liquid to flow in a thin film. The film may be exposed to a vacuum that forces the gas to escape and break out of the mud/liquid mixture. Alternatively, the degasser may be an atmospheric degasser. An atmospheric degasser processes the liquid by acceleration through a pump impeller that functions like a beater. Baffles may be provided to maximize surface area. The liquid may be mixed, enabling the gas to escape and vent to the atmosphere.

The remaining fluid 80 from which the gas has escaped may be delivered to a liquid trap assembly 32 (described in more detail below). The released gases 16 may be transported to a vortex cooler 18. At this point in the process, the released gases 16 may generally be moisture-laden and high in temperature. Heat may also be added prior to the degassing process in order to encourage escape of the gas. Accordingly, the vortex cooler 18 may be provided to remove heat from the sample gas prior to analysis.

The cooled sample gas 20 then leaves the vortex cooler 18 and may be delivered to a condensate separator 22. The gas that leaves the vortex cooler 18 can be referred to as cooled sample gas 20 laden with condensate. The condensate separator 22 may cause the sample gas to "drop out" any condensates 28. The gas resulting from this final process may be referred to as a cooled/dry sample gas 24 that is ready for analyzing. This gas 24 may be delivered to any appropriate testing or analyzing location. The resulting gas and condensate mixture 28 may then be routed appropriately.

Using a gas extraction system according to some examples can avoid unused gas with condensates returning back to the degasser. For example, gas analyzers generally require about 1000 cc/min of sample gas. Certain gas extraction systems, however, can be capable of producing about +/−5 liters/min (5000 cc/min) of sample gas. This results in extra gas that may be routed back into the system. Instead of routing this gas/condensate material to the degasser for another flow through the system due to a high-speed gas extraction loop, the examples described allow delivery of the condensate 84 (and any accompanying unused gasses) to a liquid trap assembly 32, as shown in FIG. 2. In one example, this is because the pump described allows the flow loop to be slowed. This can help reduce the possibility of continuously recycling these gases and liquids in a decaying concentration (through their re-delivery to the degasser). It is generally efficient to have primarily "new" sample gas being delivered to the analyzers instead of potentially recycling "old" or stale sample gas. It is also generally efficient to slow the loop so that heat is not continuously being recycled as well.

Accordingly, certain aspects and features of this disclosure relate to using a peristaltic pump 30 in a gas extraction system. For example, a peristaltic pump 30 provides variable and/or slow flow through the flow loop, so that the condensate/unused gas mixture 28 can be re-routed to a more desirable location. The use of a peristaltic pump 30 provides an improved process flow change over high speed loops.

As shown in FIG. 2, a peristaltic pump 30 can be used to deliver a condensate/unused gas mixture 84 directly to a liquid trap assembly 32. The peristaltic action of the pump 30 may be more controllable and/or slower than typically-used diaphragm pumps. A peristaltic pump 30 may allow the gas extraction system 10 enough time to collect sufficient gas for testing, such that the condensates 84 can be removed during their initial flow through the system 10. In the example shown, condensates 28 leaving the condensate separator 22 may be delivered to a peristaltic pump 30, which delivers a condensate stream 84 to the liquid trap assembly 32. In use, the liquid trap assembly 32 maintains a level of fluid that remains in the trap 32 to act as a seal during operation.

Thus, the liquid trap 32 originally served as the main receptacle for fluids 80 flowing out of the degasser 12 during the initial degassing step of the process. By providing a slower, more controlled peristaltic pump 30 in the system 10, the liquid trap 32 can also now serve as a receptacle for condensates/gasses 84 at the end of the flow loop. The removed fluids 80 and the condensates 84 can exit the liquid trap assembly 32 via an exit outlet 82 to rejoin the drilling fluid on the rig. The removed materials may be directed via a return pump.

With the pump improvements described by this disclosure, the liquid trap assembly 32 may now also serve as a direct receptacle for the condensates 84 removed from the condensate separator 22. This may be preferable to delivering the condensates back to the degasser 12. This can help prevent depletion of all of the sample from the system. The condensate mixture can then be subsequently removed from the flow loop and remixed with the drilling fluids. This can eliminate the possibility of recycling any sample gas components and can improve gas extraction processes.

Figure 3:
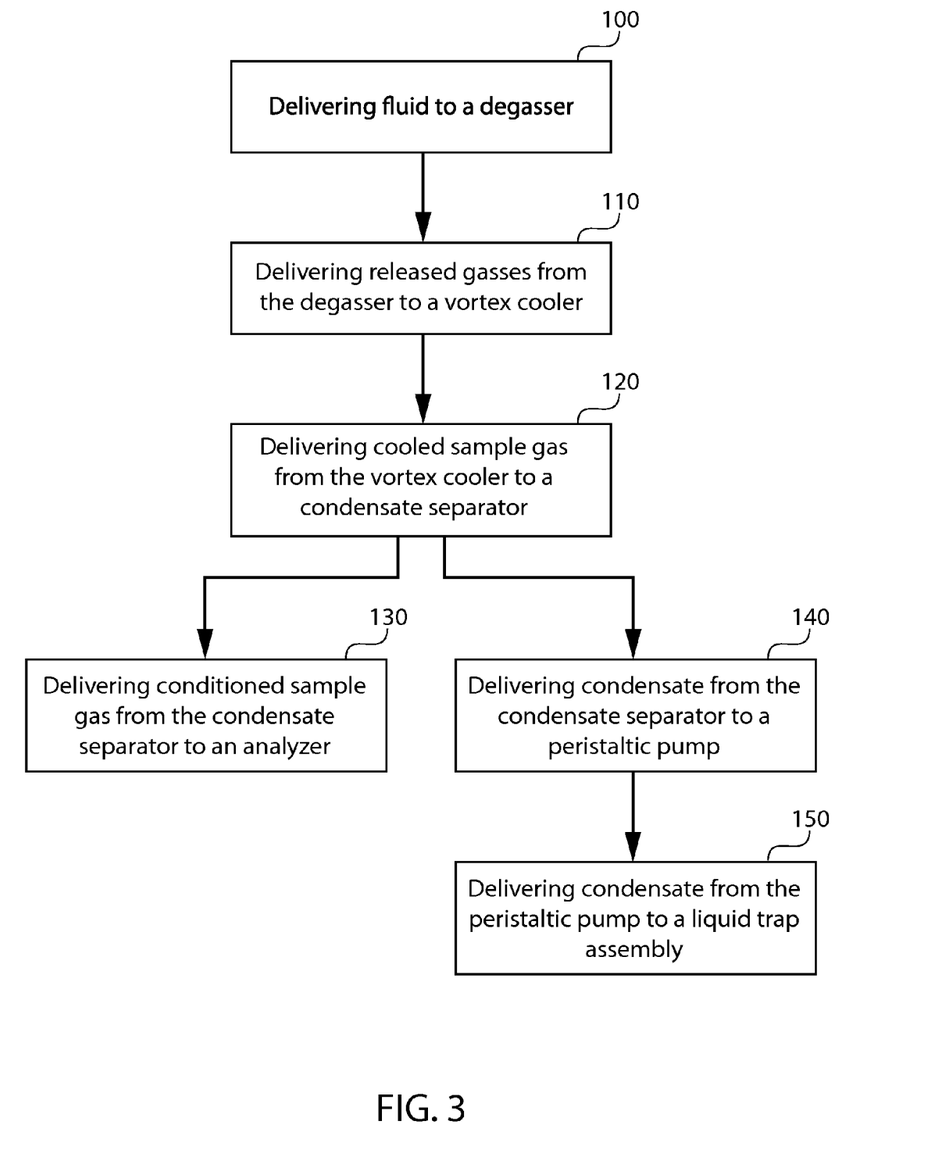
FIG. 3 is a flow chart illustrating the flow of gas and condensates in a gas extraction system according to one example.

A schematic of this fluid flow is illustrated in FIG. 3. FIG. 3 shows a fluid flow through a gas extraction system. In block 100, fluid may be delivered to a degasser. In one example, fluid may be delivered to the degasser from other filtering systems on the skid. This delivery may be via tubing, piping or any other appropriate fluid conduit. The fluid may have large solids removed and be ready for extraction/liberation of gas from the fluid. The degasser agitates the flow in order to release/extract gasses.

In block 110, the released gasses may be delivered from the degasser to a vortex cooler. In one example, the released gasses may be in the form of a hot/wet sample gas. This delivery may be via tubing, piping, or any other appropriate fluid conduit. The vortex cooler 18 may act to cool the gas sample that it receives.

In block 120, the cooled gas sample may be delivered from the vortex cooler to a condensate separator. This delivery may be via tubing, piping, or any other appropriate fluid conduit. In one example, the gasses received by the condensate separator may be in the form of a cooled sample gas that may be laden with condensates. The condensate separator separates the condensates from the gas sample for analysis.

In block 130, the conditioned gas sample from the condensate separator may be delivered to an analyzer or analyzer system. For example, the gaseous sample stream may be delivered to an array of analytical devices and/or collection systems for processing. The sample gas may be transported via a hose or tube to an array of analyzers where the chemical signature of the gases can be defined and recorded. The processed data gathered from the analyzers can be tied back to the time/depth of the drilling event and used to construct a well log.

In block 140, the condensates that have been separated from the sample gas are delivered from the condensate separator to a peristaltic pump. This delivery may be via tubing, piping, or any other appropriate fluid conduit. The peristaltic pump may be used to move the condensate from the condensate separator to a liquid trap assembly. The peristaltic pump may have one or more of the features described herein. For example, the pump may have specialized tubing that is suitable for withstanding chemical aspects of drilling fluid. For example, the pump may have a specialized air motor that allows it to function in a hazardous environment. Other options are also possible.

In block 150, the peristaltic pump may deliver the condensate through the peristaltic pump tubing to a liquid trap assembly 150. This delivery may be via tubing, piping, a direct connection between the components, or any other appropriate fluid conduit.

Certain systems of this disclosure provide improved flow. For example, use of a peristaltic pump 30 can improve the gas extraction process and the readings from the sample gas obtained. It may ensure that "new" gasses are delivered to the analyzers. Removing the high-speed gas loop may allow the product 28 of the condensate separator 22 to be pumped through the peristaltic pump 30, and the condensate stream 84 can then be routed to the liquid trap assembly 32 and subsequently removed from the process, as shown by arrow 34.

For example, the use of a peristaltic pump 30 can also help eliminate the high speed loop. This can appreciably restore the cooling effect of the vortex cooler 18. The peristaltic action of slowly pumping the condensate from the separator 22 can slow the high speed loop. For example, the pump may move fluid at a rate of about 10-50 cc/min. Slowing the movement of the system flow can allow removal of the heated condensates 84, such that the heat may not be transferred back to the vortex cooler 18. It can also increase the efficiency of the system 10 by minimizing the moisture that may otherwise travel to downstream analyzers.

Historically, degassing drilling fluids has been atmospherically balanced (open to the atmosphere) and not conducted in a pressurized system. In the last few years, drilling companies have been exploring gas extraction in a pressurized/sealed environment (not open to the atmosphere). This renders use of a self-sealing pump, such as the disclosed peristaltic pump, more workable in a pressurized environment. The peristaltic pump 30 described may be self-sealing in both directions. The peristaltic pump 30 described may be sealed at its inlet due to pressure of one roller, cam, lobe, or other protrusion of the rotor on the tubing near the inlet and may be sealed at its outlet due to pressure from a second roller, cam, lobe, or other protrusion of the rotor on the tubing near the outlet. This renders the pump self-sealing in both directions.

Mechanical and electrical components that are used in potentially explosive atmospheres may be ATEX rated (a directive describing what equipment is allowed in an environment with an explosive atmosphere and is an acronym for Appareils destinés à être utilisés en Atmosphères Explosives). Because they may be used in connection with a potentially explosive atmosphere, the components should be tested and certified. Traditional electric motors of peristaltic pumps have not been so tested and most ATEX certified electrical drive motors are expensive and weigh more than desirable. Accordingly, a customized drive mechanism 36 for the peristaltic pump 30 may be provided.

Figure 4:
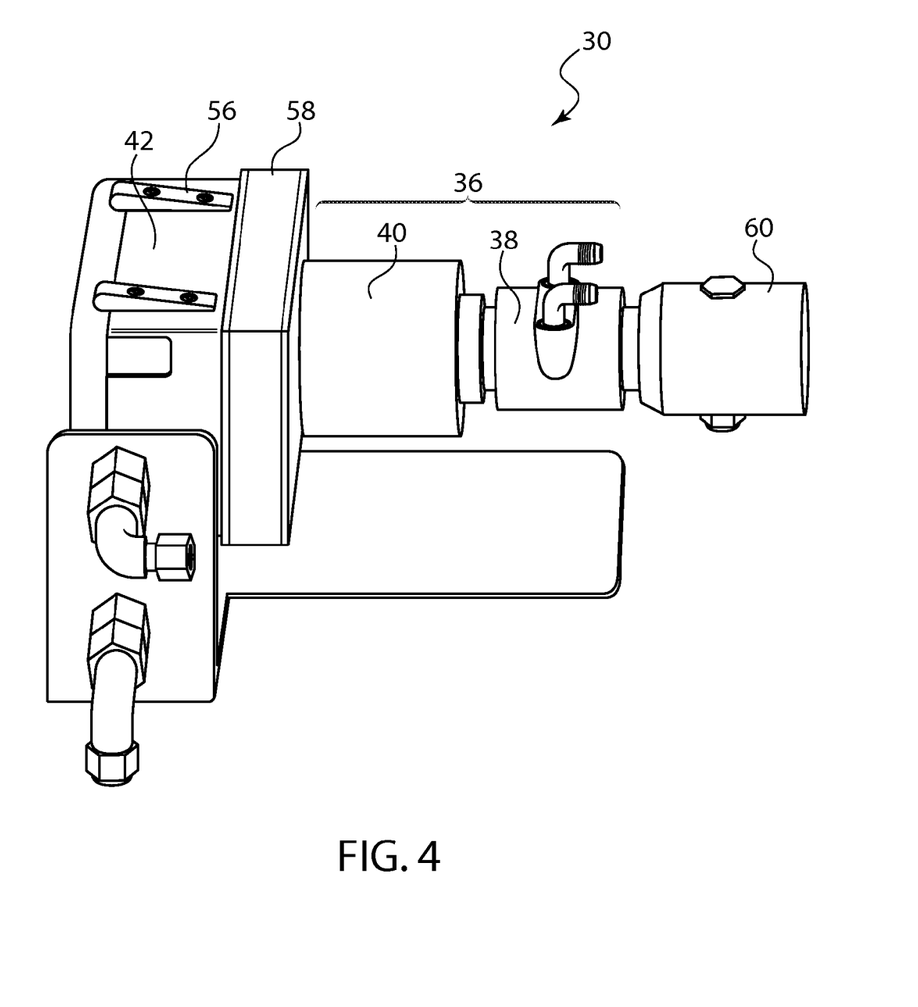
FIG. 4 is a side perspective view of a peristaltic pump that may be used in accordance with this disclosure.

The peristaltic pump 30 is not electrically driven, but uses an air motor 38 which takes the place of the electrical device. In one example, the electric pump may be replaced with an air motor 38 on a peristaltic pump head 42 in the condensate circuit. One example of an air motor that has been tested and ATEX certified is manufactured and sold by Gast Manufacturing, Inc. It has been found that various embodiments according to the present disclosure provide combinations of the following improvements.

For example, an improved data quality may be generated from a hydrocarbon gas extraction and measurement system. Process control may be improved by using the improved peristaltic pump 30, which can generally be controllable with regard to volume/rate. For example, there may be an increased mean time between failures (MTBF) once the peristaltic pump 30 is installed in the system 10. For example, there may be quicker and easier maintenance and/or replacement of the pump. One reason for this is because the peristaltic pump 30 may be a less complex device than the current pump.

Referring now to FIG. 4, the peristaltic pump 30 may also have a gearbox 40 between the pump head 42 and the air motor 38 to increase torque, to change the pump head speed (as compared to the air motor speed), or both. The gearbox 40 may be secured to the pump head housing 56 via an adapter plate 58. The gearbox 40 may increase torque, change pump head speed, or both. A sensor housing 60 may also be provided, which may include a proximity switch sensor that counts RPM of the peristaltic rotor.

As shown in FIG. 2, the peristaltic pump 30 has an inlet 44 for receiving condensate 28 from the condensate separator 22. The pump 30 also has an outlet 46 for delivering condensates 28 to the liquid trap assembly 32. The peristaltic pump 30 may be a positive displacement pump that has a flexible tube 48 fitted between the inlet 44 and the outlet 46. Fluid and condensates 28 travel from the separator 22 to the pump inlet 44. The fluid/condensate mixture 28 travels through the flexible tube 48 and exits at the pump outlet 46, for delivery to the fluid trap assembly 32.

A rotor 50 with two or more protrusions compresses ("occlusion") and releases ("restitution") the flexible tube 48. The protrusions 52 may be rollers, cams, lobes, or any other structure capable of occluding and releasing the tube 48. As the rotor 50 turns, the part of the tube 48 under compression may be pinched closed (or "occluded") by a protrusion 52. Fluid in the tube in front of the protrusion 52 is "pushed" through the tube via rotation of the rotor 50 and pressure from the protrusion 52. As the tube 48 opens to its natural state ("restitution") after the protrusion 52 passes, the fluid flow may be pressed out the outlet 46. The tube space behind the protrusion 52 is without fluid, but a new portion of fluid to be moved is created by a new pinching of the protrusion 52 due to continued movement of the rotor 50. By providing alternating sections of fluid to be moved and by trapping portions of fluid to be moved between protrusions 52, the peristaltic pump 30 can create a slowed and controlled flow of fluid. The pump 30 may run continuously, or it may be indexed through partial revolutions to deliver smaller amounts of fluid.

Because the gas extraction system 10 may be intended for use in extreme conditions of pressure and temperature, and in some instances, offshore, the tubing 48 may be designed to withstand such conditions. The material may be chemically compatible with drilling fluids and gasses and not degrade or otherwise fail. The material may also experience aggressive pressure from the protrusions 52, so it may be capable of withstanding continued peristaltic rotations and pressure from the protrusions 52. The material may be able to withstand chemical aspects due to contact with the drilling fluid, as well as the mechanical aspects due to continued pressure and contact with the protrusions. Nonetheless, the material may be compressible such that the rotor protrusions can depress portions of the tubing and then allow it flex back to shape to move the fluid contained therein.

In one example, the material used for the pump tubing 48 may be an expanded polytetrafluoroethylene (PTFE) reinforced tubing, such as that sold by Gore® STA-PURE® pump tubing. It has been found that this material can withstand the rigors of the gas extraction system described. In another example, the material used may be a synthetic fluoropolymer or tetrafluoroethylene (such as Teflon or Viton®), a fluoro elastomer, or any other material that can withstand the above-described conditions.

The material may be provided in any appropriate dimensions that suit the particular size and capacity of the desired pump. In one particular example, the tubing may be about ¼" in diameter and about 13" long.

The system 10 may also include one or more computers or other controllers 54 that provide a control loop for the peristaltic pump 30. The controller can set a specific RPM for the pump 30 in order to maintain speed control. The controller 54 can create a speed control loop that can work with an RPM sensor on the pump 30 in order to sense and make necessary changes.

The peristaltic pumping action of the peristaltic pump 30 can thus add significant improvements to the control and management of condensate 28 removal. The peristaltic pump 30 designed for this disclosure may be capable of slowed pump rates. The peristaltic pump 30 designed for this disclosure may be capable of non-shearing action. The peristaltic pump 30 designed for this disclosure may be capable of the ability to pump gases, liquids, slurries, and high viscosity fluids. The peristaltic pump 30 designed for this disclosure may be capable of self-sealing in both forward and reverse directions, during pumping and/or when stopped. The peristaltic pump 30 designed for this disclosure may be capable of dosing consistent and/or measureable volume/rates. The peristaltic pump 30 designed for this disclosure may have a limited number of moving parts, rendering it a less complicated design, and providing ease of repair and maintenance. The peristaltic pump 30 designed for this disclosure may be capable of maintaining the condensates to be pumped distinct from any exposed pump components.

In some aspects, a gas extraction system may be provided for removing condensate from the gas to be analyzed according to one or more of the following examples.

Example 1

A gas extraction system for gas analysis that has a degasser for separating gasses out of drilling fluid; a vortex cooler for removing heat from separated gasses; a condensate separator for separating cooled gas laden with condensates; a peristaltic pump for moving condensates to a liquid trap assembly; and a liquid trap assembly for receiving condensates from the peristaltic pump.

Example 2

The gas extraction system of Example 1 can feature the peristaltic pump having an air motor.

Example 3

The gas extraction system of Example 1 can feature the peristaltic pump having tubing of a material suitable for withstanding drilling fluid condensates and intermittent occlusion and restitution.

Example 4

The gas extraction system of Example 1 can feature the peristaltic pump including a rotor and at least two protrusions.

Example 5

The gas extraction system of Example 1 can feature the peristaltic pump including an inlet in fluid communication with the condensate separator and an outlet in fluid communication with the liquid trap assembly.

Example 6

The gas extraction system of Example 1 can feature the liquid trap assembly returning condensates to a drilling fluid flow.

Example 7

The gas extraction system of Example 1 can feature the peristaltic pump including an inlet, an outlet, tubing extending between the inlet and the outlet, and a rotor having at least first and second protrusions, with the pump being self-sealing due to pressure on the tubing from the first protrusion near the inlet and pressure on the tubing from the second protrusion near the outlet.

Example 8

The gas extraction system of Example 1 can feature the peristaltic pump including a pump rate of about 10-50 cc/min.

Example 9

The gas extraction system of Example 1 can feature the peristaltic pump including a gearbox between a pump head and an motor to increase torque, change pump head speed, or both.

Example 10

A gas extraction system that includes a condensate separator and a liquid trap, the gas extraction system further including a self-sealing peristaltic condensate pump, comprising a peristaltic pump head and an air motor, wherein the peristaltic condensate pump delivers condensate received from the condensate separator to the liquid trap assembly.

Example 11

The gas extraction system of Example 10 can feature the peristaltic pump having tubing of a material suitable for withstanding drilling fluid condensates and intermittent occlusion and restitution.

Example 12

The gas extraction system of Example 10 can feature the peristaltic pump including a rotor and at least two protrusions.

Example 13

The gas extraction system of Example 10 can feature the peristaltic pump including an inlet in fluid communication with the condensate separator and an outlet in fluid communication with the liquid trap assembly.

Example 14

The gas extraction system of Example 10 can feature the peristaltic pump being self-sealing.

Example 15

The gas extraction system of Example 10 can feature the peristaltic pump including a pump rate of about 10-50 cc/min.

Example 16

The gas extraction system of Example 10 can feature the peristaltic pump further including a gearbox between a pump head and an motor to increase torque, change pump head speed, or both.

Example 17

A method for extracting gas from a fluid using a gas extraction system can include releasing gasses from the fluid by a degasser; delivering released gasses from the degasser to a vortex cooler; cooling the released gasses to provide a cooled sample gas laden with condensate; delivering the cooled sample gas laden with condensate from the vortex cooler to a condensate separator; separating sample gas from condensates; delivering sample gas from the condensate separator to an analyzer; delivering condensate from the condensate separator to a peristaltic pump; pumping the condensate to a liquid trap assembly.

Example 18

The fluid flow of Example 17 can feature the peristaltic pump including an air motor and tubing of a material suitable for withstanding drilling fluid condensates and continued intermittent occlusion and restitution.

Example 19

The fluid flow of Example 17 can feature the peristaltic pump including an inlet in fluid communication with the condensate separator and an outlet in fluid communication with the liquid trap assembly.

Example 20

The fluid flow of Example 17 can feature the liquid trap assembly collecting condensates and returning the condensates to a drilling fluid flow via a return pump.

The foregoing description, including illustrated aspects and examples, has been presented only for the purpose of illustration and description and is not intended to be exhaustive or to limiting to the precise forms disclosed. Numerous modifications, adaptations, and uses thereof will be apparent to those skilled in the art without departing from the scope of this disclosure.

What is claimed is:

1. A gas extraction system for gas analysis, comprising:
   a degasser for separating gasses out of drilling fluid;
   a vortex cooler for removing heat from separated gasses;
   a condensate separator for separating cooled gas laden with condensates;
   a peristaltic pump for moving condensates to a liquid trap assembly; and
   a liquid trap assembly for receiving condensates from the peristaltic pump.

2. The gas extraction system of claim 1, wherein the peristaltic pump comprises an air motor.

3. The gas extraction system of claim 1, wherein the peristaltic pump comprises tubing of a material suitable for withstanding drilling fluid condensates and intermittent occlusion and restitution.

4. The gas extraction system of claim 1, wherein the peristaltic pump comprises a rotor and at least two protrusions.

5. The gas extraction system of claim 1, wherein the peristaltic pump comprises an inlet in fluid communication with the condensate separator and an outlet in fluid communication with the liquid trap assembly.

6. The gas extraction system of claim 1, wherein the liquid trap assembly returns condensates to a drilling fluid flow.

7. The gas extraction system of claim 1, wherein the peristaltic pump comprises an inlet, an outlet, tubing extending between the inlet and the outlet, and a rotor having at least first and second protrusions, and wherein the pump is self-sealing due to pressure on the tubing from the first protrusion near the inlet and pressure on the tubing from the second protrusion near the outlet.

8. The gas extraction system of claim 1, wherein the peristaltic pump provides a pump rate of about 10-50 cc/min.

9. The gas extraction system of claim 1, wherein the peristaltic pump further comprises a gearbox between a pump head and an motor to increase torque, change pump head speed, or both.

10. A method for extracting gas from a fluid using a gas extraction system, comprising:
    releasing gasses from the fluid by a degasser;
    delivering released gasses from the degasser to a vortex cooler;
    cooling the released gasses to provide a cooled sample gas laden with condensate;
    delivering the cooled sample gas laden with condensate from the vortex cooler to a condensate separator;
    separating sample gas from condensates;
    delivering sample gas from the condensate separator to an analyzer;
    delivering condensate from the condensate separator to a peristaltic pump;
    pumping the condensate to a liquid trap assembly.

11. The fluid flow of claim 10, wherein the peristaltic pump comprises an air motor and tubing of a material suitable for withstanding drilling fluid condensates and continued intermittent occlusion and restitution.

12. The fluid flow of claim 10, wherein the peristaltic pump comprises an inlet in fluid communication with the condensate separator and an outlet in fluid communication with the liquid trap assembly.

13. The fluid flow of claim 10, wherein the liquid trap assembly collects condensates and returns the condensates to a drilling fluid flow via a return pump.

* * * * *